US012706504B2

(12) United States Patent
Arnold et al.

(10) Patent No.: US 12,706,504 B2
(45) Date of Patent: Aug. 11, 2026

(54) E-MACHINE SYSTEM WITH MULTI-FUNCTION SUPPORT BRACKET FOR ELECTRICAL COMPONENT

(71) Applicant: Garrett Transportation I Inc., Torrance, CA (US)

(72) Inventors: Philippe Arnold, Thaon les Vosges (FR); Peter Davies, Thaon les Vosges (FR); Michael Ladonnet, Thaon les Vosges (FR); Nathaniel Bontemps, Thaon les Vosges (FR)

(73) Assignee: GARRETT TRANSPORTATION I INC., Torrance, CA (US)

( * ) Notice: Subject to any disclaimer, the term of this patent is extended or adjusted under 35 U.S.C. 154(b) by 162 days.

(21) Appl. No.: 18/533,399

(22) Filed: Dec. 8, 2023

(65) Prior Publication Data

US 2025/0192637 A1 Jun. 12, 2025

(51) Int. Cl.
*H02K 5/04* (2006.01)
*H02K 9/00* (2006.01)
*H02K 11/33* (2016.01)

(52) U.S. Cl.
CPC ................. *H02K 5/04* (2013.01); *H02K 9/00* (2013.01); *H02K 11/33* (2016.01)

(58) Field of Classification Search
CPC . H02K 5/04; H02K 9/00; H02K 11/33; H02K 9/12; H02K 5/22; H02K 5/225
See application file for complete search history.

(56) References Cited

U.S. PATENT DOCUMENTS

2013/0021749 A1* 1/2013 Nakajima .......... H05K 7/20927 361/689
2015/0199376 A1* 7/2015 Matsuo .................. G06F 16/13 707/626
2016/0069349 A1* 3/2016 Kreidler ................ H02K 11/33 29/888.024
2019/0111866 A1 4/2019 Ito et al.
2019/0296655 A1* 9/2019 Chung .................. H02K 5/225
2021/0348549 A1 11/2021 Louco et al.
2022/0247252 A1 8/2022 Zipf et al.
2023/0184137 A1 6/2023 Fedorikhin et al.

FOREIGN PATENT DOCUMENTS

DE 102015218622 A1 * 3/2017 ............ H02K 11/33
EP 3944476 A1 1/2022

OTHER PUBLICATIONS

English translation of DE-102015218622-A1 (Year: 2017).*

* cited by examiner

*Primary Examiner* — Tulsidas C Patel
*Assistant Examiner* — Joshua Kiel M Rodriguez
(74) *Attorney, Agent, or Firm* — BelayIP

(57) ABSTRACT

An e-machine system includes an e-machine with a rotating group and a housing. The rotating group is supported for rotation within the housing. Also, the e-machine system includes an electrical component that is electrically connected to the e-machine. The electrical component includes at least one of an electrical terminal and a coolant passage for a fluid coolant. Moreover, the e-machine system may include a support bracket that supports and retains the electrical component outside the housing. The support bracket includes an aperture for the at least one of the electrical terminal and the coolant passage.

18 Claims, 4 Drawing Sheets

E-MACHINE SYSTEM WITH MULTI-FUNCTION SUPPORT BRACKET FOR ELECTRICAL COMPONENT

TECHNICAL FIELD

The technical field generally relates to an e-machine system and, more particularly, relates to an e-machine system with a multi-function support bracket for an electrical component.

BACKGROUND

Various electric machine (i.e., e-machine) systems are provided for a variety of uses. For example, electric compressor systems include electric motors that drive a compressor wheel for delivering a compressed fluid to another component (e.g., a fuel cell stack, an internal combustion engine, etc.). Other e-machine systems may include an electric generator that converts mechanical power into electricity.

These e-machine systems may include a plurality of components that need to be supported securely within the assembly. Preferably, the plurality of components can be contained compactly within a limited amount of space; however, this can be difficult. Also, some components may have requirements or characteristics that affect packaging of the assembly. For example, some components may need to be easily accessible for repair, replacement, etc. Some components may have terminal connections (e.g., for electrical connection, coolant fluid connection, or other connections) that can present additional difficulties.

Accordingly, it is desirable to provide an improved e-machine system with features that robustly support an electrical component of an e-machine. It is also desirable to provide a support member with features that facilitate, enable, and ensure connection (e.g., electrical connection and/or fluid connection) to the electrical component. Additionally, it is desirable to provide an e-machine system in which the electrical component may be supported independent of the e-machine. Furthermore, other desirable features and characteristics will become apparent from the subsequent detailed description and the appended claims, taken in conjunction with the accompanying drawings and this background.

BRIEF SUMMARY

In one embodiment, an e-machine system is disclosed that includes an e-machine with a rotating group and a housing. The rotating group is supported for rotation within the housing. Also, the e-machine system includes an electrical component that is electrically connected to the e-machine. The electrical component includes at least one of an electrical terminal and a coolant passage for a fluid coolant. Moreover, the e-machine system may include a support bracket that supports and retains the electrical component outside the housing. The support bracket includes an aperture for the at least one of the electrical terminal and the coolant passage.

In an additional embodiment, a method of manufacturing an e-machine system is disclosed that includes providing an e-machine with a rotating group and a housing. The rotating group is supported for rotation within the housing. Also, the method includes electrically connecting an electrical component to the e-machine. The electrical component includes at least one of an electrical terminal and a coolant passage for a fluid coolant. Moreover, the method includes supporting and retaining the electrical component relative to the turbomachine outside the housing with a support bracket. The support bracket includes an aperture for the at least one of the electrical terminal and the coolant passage.

Furthermore, in an additional embodiment, an e-machine system is disclosed that includes an e-machine with a rotating group and a housing. The rotating group is supported for rotation within the housing. Also, the e-machine system includes a support member with an outer support surface. Moreover, the e-machine system includes an inverter that is electrically connected to the e-machine. The inverter includes an electrical terminal and a coolant passage for a fluid coolant. Also, the e-machine system includes a support bracket that is attached to the support member and that supports and retains the inverter outside the housing. The support bracket includes a first aperture providing access for electrical connection to the electrical terminal of the inverter. The support bracket includes a second aperture configured for fluid communication with the coolant passage of the inverter.

BRIEF DESCRIPTION OF DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Broadly, example embodiments disclosed herein include an e-machine system with an e-machine, such as an electrical motor or generator. The e-machine system also includes an electrical component of the e-machine, such as an inverter, which is electrically connected to the e-machine. The e-machine system also includes a support bracket that supports and retains the electrical component independent of the e-machine. The support bracket may also include one or more features, such as apertures, that facilitate electrical connection of the inverter to the e-machine and/or within a larger electrical circuit. The support bracket may further include one or more features, such as apertures, configured for fluidly connecting to a fluid passage of the electrical component and/or within a larger fluid system. Thus, the support bracket may robustly support the electrical component while also facilitating electrical and/or fluid connection of the electrical component. In some embodiments, for example, the support bracket may be used to support an electrical inverter independently from and spaced apart from an electric motor. The inverter may be electrically connected to the electric motor via one or more features that are included on the support bracket. Furthermore, the inverter may be fluidly connected within a fluid coolant system via one or more features that are included on the support bracket.

Figure 1:
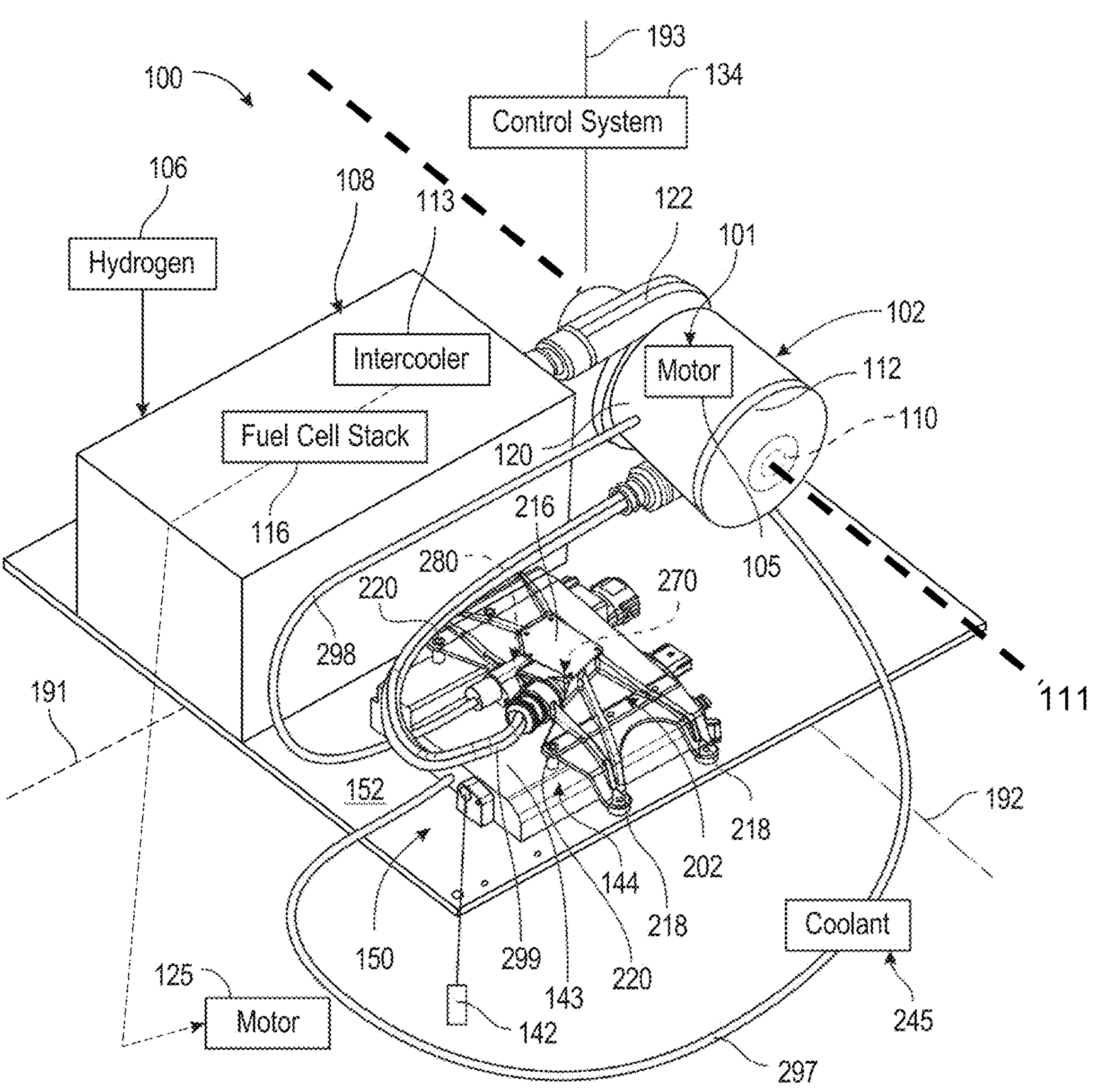
FIG. 1 is a perspective view of an e-machine system, which includes a multi-function support bracket for an electric component thereof, according to example embodiments of the present disclosure.

FIG. 1 is a schematic view of an e-machine system 100 according to example embodiments. The e-machine system 100 may have a variety of configurations without departing from the scope of the present disclosure. For example, the e-machine system 100 may comprise an e-machine 101 (i.e., a machine that operates using electromagnetic forces, such as an electric motor or an electric generator). In some embodiments, the e-machine system 100 may also include a turbomachine 102 that is operatively coupled to and/or that comprises the e-machine 101. Furthermore, the e-machine system 100 may include, comprise, and/or be operatively coupled to a fuel cell system 108.

In some embodiments, the turbomachine 102 may be a motorized compressor device having a rotating group 110 (shown schematically) that is supported for rotation about an axis 111 within a housing 112. The housing 112 and the rotating group 110 therein may cooperate to define a motor section 120 and a compressor section 122, which are arranged side-by-side along the axis 111 of the turbomachine 102.

The e-machine 101 may be an electric motor 105 that is configured to drive rotation of the rotating group 110 within the housing 112 of the turbomachine 102. The motor 105 may include a stator member that is fixed within the housing 112 and a rotor member that is operably coupled to and supported on a shaft of the rotating group 110. Also, the rotating group 110 may include a compressor wheel that is disposed within the housing 112 in the compressor section 122.

The motor 105 may be an alternating current (AC) motor. The e-machine system 100 may further include an electrical power source 142, such as a DC battery. The power source 142 may be electrically connected motor 105, and an inverter 144 may be operatively connected therebetween.

During operation, the motor 105 may drivingly rotate the compressor wheel within the housing 112 such that the compressor section 122 provides a pressurized fluid (e.g., compressed air) to a fuel cell stack 116 of the fuel cell system 108. Thus, the turbomachine 102 may compress air as it flows toward the fuel cell stack 116 for boosting the operating efficiency of the fuel cell system 108. The system 100 may also include an intercooler 113 that is disposed between the compressor section 122 and the fuel cell stack 116 so as to cool the compressed air stream delivered from the compressor section 122 as the stream flows toward the fuel cell stack 116.

The fuel cell stack 116 may contain a plurality of fuel cells. Hydrogen may be supplied to the fuel cell stack 116 from a tank 106, and oxygen may be supplied to the fuel cell stack 116, at least partly by the compressor section 122, to generate electricity by a known chemical reaction. The fuel cell stack 116 may generate electricity for an electrical device, such as an electric motor 125. The fuel cell system 108 may be included in a vehicle, such as a car, truck, sport utility vehicle, van, motorcycle, train, boat, etc. In these embodiments, the electrical motor 125 powered by the fuel cell stack 116 may drive and rotate an axle for propelling the vehicle.

Various components of the system 100 may be controlled by a control system 134. The control system 134 may be a computerized system with a processor, various sensors, a memory device, and other components for electrically controlling operation of the fuel cell stack 116, the motor 105, the motor 125, and/or other features of the system 100. In some embodiments, the control system 134 may define or may be part of the electrical control unit (ECU) of a vehicle.

These and/or additional components of the system 100 may be supported on a support member 150 of the system 100. Although illustrated schematically as a flat plate, the support member 150 may have a variety of shapes and features without departing from the scope of the present disclosure. For example, the support member 150 may be a chassis of a vehicle in some embodiments. The support member 150 may include an outer support surface 152. The outer support surface 152 may be a top surface of the support member 150. As shown, the turbomachine 102 may be supported on the outer support surface 152. Also, one or more components of the fuel cell system 108 may be supported on the outer support surface 152. Moreover, the inverter 144 may be supported proximate the outer support surface 152 as will be discussed in greater detail below. As represented in the illustrated embodiments of FIG. 1, the inverter 144 may be spaced apart at a distance from the turbomachine 102 and from the motor 105 therein. In other words, the inverter 144 may be disposed outside the housing 112 of the turbomachine 102. The inverter 144 may be supported independently from the housing 112 of the turbomachine 102 and from the motor 105 therein.

The support member 150 may define a reference Cartesian coordinate system with a first axis 191, a second axis 192, and a third axis 193 disposed perpendicular to each other. The outer support surface 152 may lie within the plane defined by the first axis 191 and the second axis 192, and the third axis 193 may be normal to the outer support surface 152.

The e-machine system 100 may further include a support bracket 202. The support bracket 202 may be attached to the support member 150. In some embodiments, the support bracket 202 may be attached directly to the support member 150. In additional embodiments, the support member 150 may include a seat member between the outer support surface 152 and the support bracket 202, and the seat member may dampen vibration, may provide thermal insulation, and/or may provide electrical insulation between the support bracket and the support member 150. When attached to the support member 150, the support bracket 202 may support and retain an electrical component of the e-machine system 100 proximate the outer support surface 152 of the support member 150. As shown in the illustrated embodiments of FIG. 1, the support bracket 202 may be attached to the support member 150 so as to cover over an outer surface 143 of the inverter 144. The outer surface 143 of the inverter 144 may face away from the support surface 152, and the inverter 144 may be attached to the support bracket 202 such that the support bracket 202 attaches the inverter 144 to the support member 150. The support bracket 202 may also include one or more additional features tailored for use with the inverter 144. Thus, the support bracket 202 may provide additional functions in addition to supporting the inverter 144. For example, the support bracket 202 may have integrated features that enable electrical and/or fluid connection of the inverter 144 to another component of the system 100. In some embodiments, for example, the support bracket 202 may include one or more apertures and/or other features that enable and facilitate electrical connection between the inverter 144 and another component (e.g., the motor 105, the power source 142, and/or other components within an electrical circuit). Furthermore, the support bracket 202 may include apertures, passages, etc. for fluidly connecting to a fluid coolant system 245, which provides flow of a fluid coolant to cool the inverter 144. More specifically, the support bracket 202 may include one or more apertures, passages, etc. that fluidly connect to the inverter 144 and/or to another component of the fluid coolant system 245.

The support bracket 202 of the e-machine system 100 may robustly support the inverter 144 independent of the electric motor 105 and the turbomachine 102. The support bracket 202 may advantageously isolate the inverter 144 from vibrational energy. The support bracket 202 may also provide convenient electrical connection for the inverter 144 (e.g., to allow for AC electrical distribution, to provide DC power, and/or to provide low voltage power and logic control signals). Also, the support bracket 202 may provide convenient fluid connection for the inverter 144 for effective coolant management. The support bracket 202 may be tailored specifically for supporting the inverter 144. The support bracket 202 also allows the inverter 144 to be quickly and conveniently repaired or replaced. This configuration also allows the inverter 144 to be packaged compactly, for example, when there are significant space constraints for the e-machine system 100.

It will be appreciated that the support bracket 202 may be configured for another electrical component (a component other than an inverter) without departing from the scope of the present disclosure. Also, the support bracket 202 may be configured for a different e-machine system 100. For example, the e-machine 101 may be an electric generator in some embodiments. The e-machine 101 may be configured for a different turbomachine, such as an e-turbocharger with both a compressor section and a turbine section as well as an electric motor. The turbomachine 102 may be a motorized turbine/expander device in some embodiments. The turbomachine 102 may include a single, solitary compressor section 122 (or a single, solitary turbine section). The turbomachine 102 may include a single compressor section and a single, associated turbine section. In additional embodiments, the turbomachine 102 may have a plurality of compressor stages that are arranged in-series. In some embodiments, there may a plurality of compressor stages that are fluidly connected to a turbine section of the turbomachine 102. The turbomachine 102 may have fixed geometry or may have variable geometry by including a wastegate, a Variable Geometry Turbine/Expander, etc. Additionally, the turbomachine 102 may be operably connected to an internal combustion engine, an e-axle, an air-conditioning system, or other system instead of the fuel cell system 108 without departing from the scope of the present disclosure.

As shown in FIGS. 1-4, the support bracket 202 may generally include a plate 205 that has areas that are flat and planar that are attached by contoured portions. The plate 205 may define a cradle 210 that is shaped according to the exterior of the inverter 144. The cradle 210 may be a thin-walled member that is polygonal in shape. As such, the cradle 210 may include a first face 231 (i.e., an outer side) and a second face 232 (i.e., an underside) that face in opposite directions, substantially along the third axis 193. The cradle 210 may include a somewhat rectangular periphery 234 that borders the first face 231 and the second face 232. The periphery 234 may include a first peripheral side 241, a second peripheral side 242, a third peripheral side 243, and a fourth peripheral side 244. The plate 205 may also include a plurality of standoffs attached to and extending from the cradle 210, such as a first standoff 211, a second standoff 212, a third standoff 213, and a fourth standoff 214. The standoffs 211, 212, 213, 214 may be integrally attached to the cradle 210, generally at corners of the periphery 234, so as to be unitary and monolithic therewith. In other words, the plate 205 may be unitary and monolithic, including the cradle 210 and the integrally attached standoffs 211, 212, 213, 214. The standoffs 211, 212, 213, 214 may be spaced apart along the periphery 234. The standoffs 211, 212, 213, 214 may project from the cradle 210 generally along the third axis 193. Also, the standoffs 211, 212, 213, 214 may turn outwardly from the axis 193 and terminate at a respective foot 236. The plate 205 may further include a connector area 279 that may be located proximate the center of the cradle 210 and that may partly define the first peripheral side 241. The connector area 279 may include projected, contoured, or otherwise shaped features for establishing electrical and/or fluid connections for the inverter 144.

The support bracket 202 may additionally include a number of connection features for connecting the inverter 144 (e.g., electrically and/or fluidly connecting) to other components of the e-machine system 100. For example, the support bracket 202 may include one or more apertures (i.e., connection apertures). The term "aperture" will be interpreted broadly to include a variety of openings, passages, channels, edge features, recesses, holes, clefts, discontinuities, etc. In some embodiments these apertures may be included in the plate 205, for example, in the connector area 279. The apertures may be useful in securing the inverter 144 to the support member 150. There may be apertures that facilitate and/or provide electrical connection for the inverter 144 within an electrical circuit. Moreover, there may be apertures that fluidly connect to the inverter 144 and that connect the inverter 144 within a fluid circuit.

Figure 4:
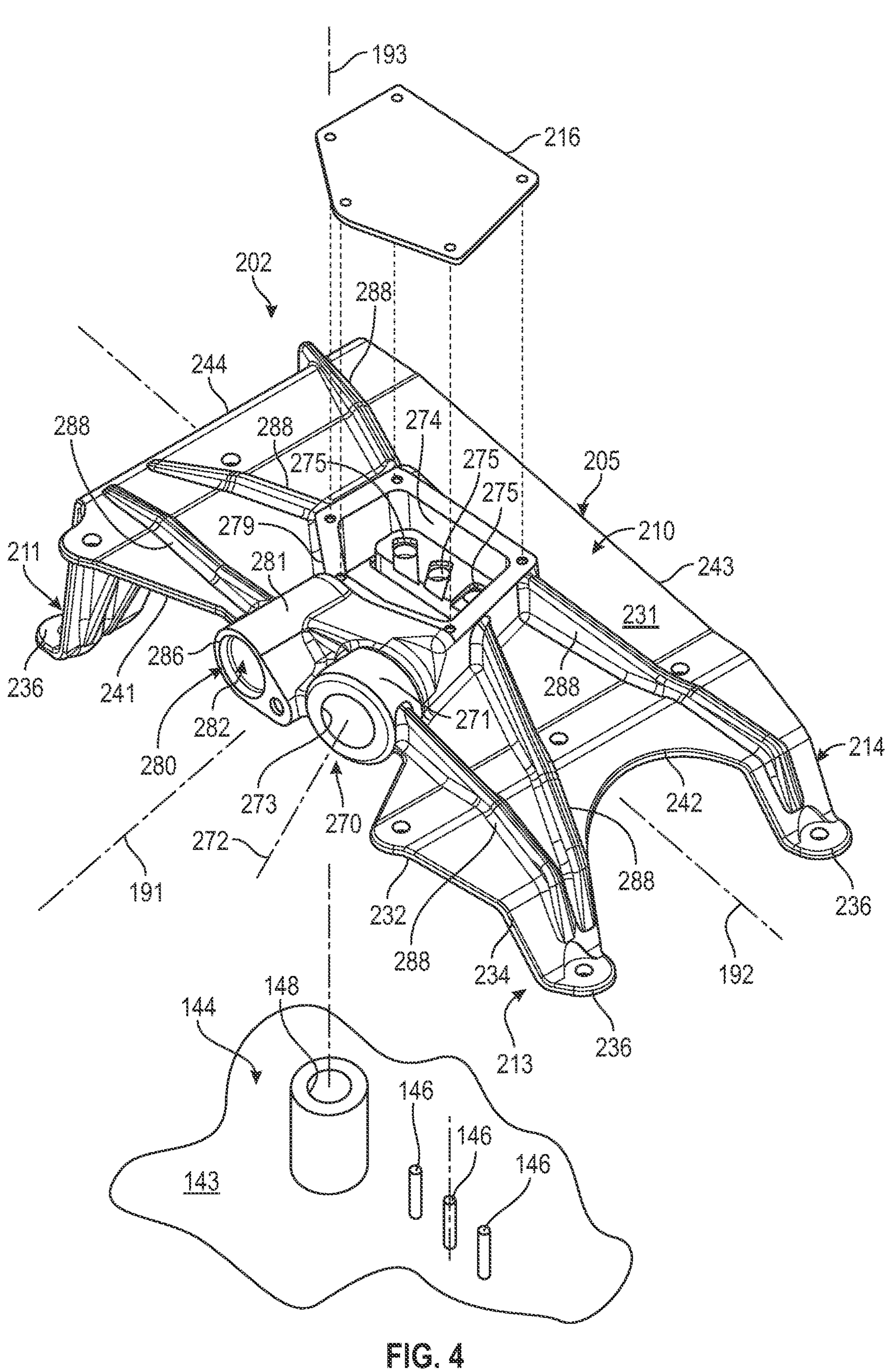
FIG. 4 is a perspective view of the support bracket according to example embodiments of the present disclosure.

For example, the plate 205 may include a first aperture 270. Generally, the first aperture 270 may enable electrical connection of the inverter 144 to the motor 105. More specifically, the first aperture 270 may be used to connect cables (e.g., AC cables) between the inverter 144 and the motor 105. In additional embodiments, the first aperture 270 may enable electrical connection for the inverter 144 and the power source 142. As shown in FIG. 4, the first aperture 270 may include a hollow connector tube 271 that is included on the first peripheral side 241 in the connector area 279. The tube 271 may have a circular cross section and may have a tube axis 272 that is straight and that extends substantially normal to the third axis 193. The tube 271 may be open at both ends. The first aperture 270 may also include a first pocket 274 that is recessed along the third axis 193 into the first face 231. The first pocket 274 may be polygonal and may include a plurality of terminal holes 275 (e.g., three holes) that are directed along the third axis 193 and that extend through a central portion of the cradle 210 from the first side 231 to the second side 232. One end of the tube 271 may be open to the first pocket 274.

The support bracket 202 may also include a cover 216 (FIGS. 1 and 4) that is removably attached to the cradle 210 of the plate 205. The cover 216 may be shaped to cover over and close off the first pocket 274. The cover 216 may be attached to the rim of the first pocket 274 using fasteners, adhesive, rivets, or otherwise. The cover 216 may be attached to cover over and close off the first pocket 274. Also, there may be included one or more seals, sealing material, sealing members, etc. between the cradle 210 and the cover 216 to seal off the first pocket 274.

Figure 3:
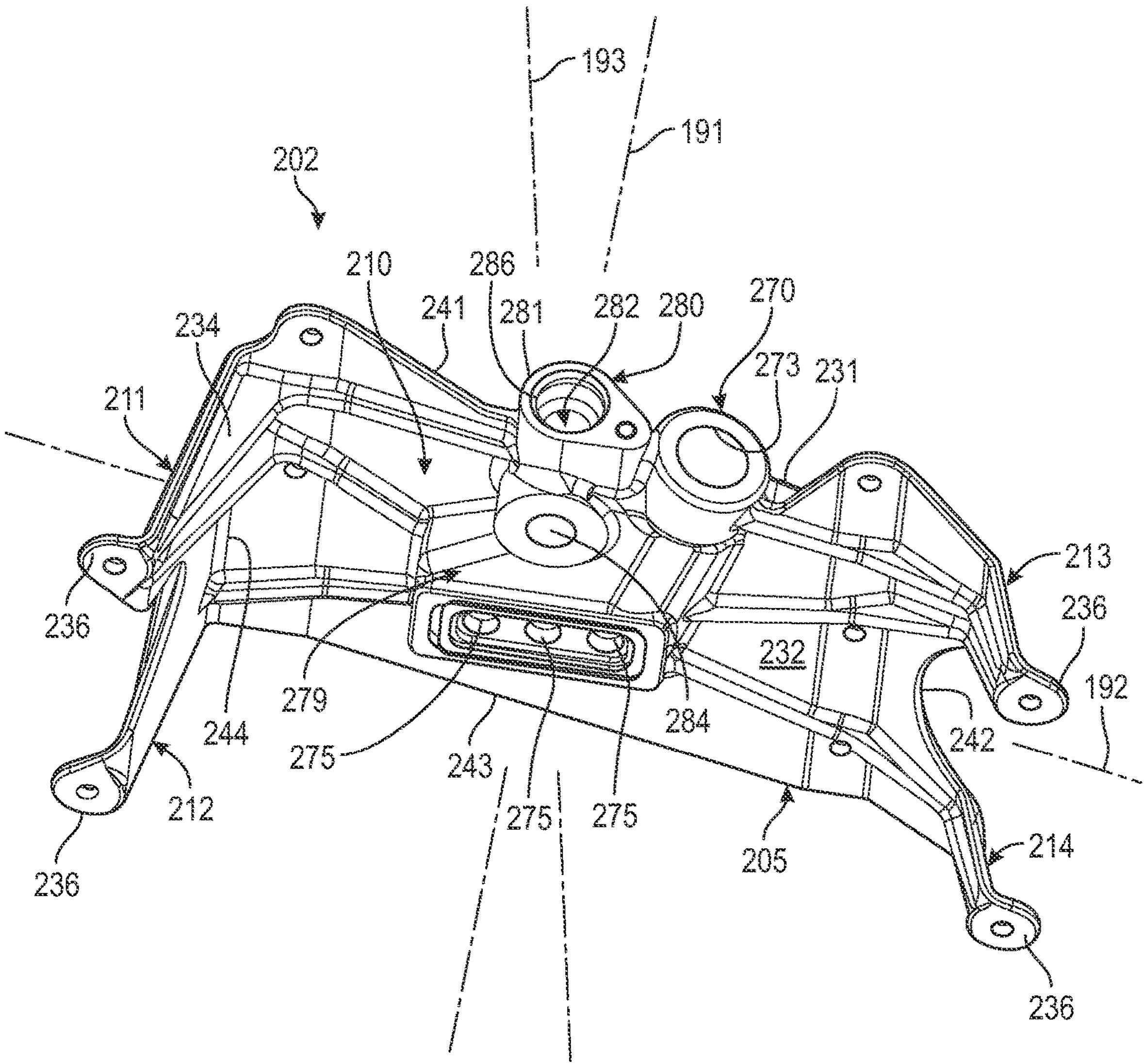
FIG. 3 is a perspective view of the support bracket according to example embodiments of the present disclosure.

The plate 205 may additionally include a second aperture 280. Generally, the second aperture 280 may provide fluid connection for the inverter 144 within the fluid coolant system 245. As shown in FIGS. 3 and 4, the second apertures 280 may include a hollow connector tube 281 with a fluid passage 282 extending axially therethrough. The fluid passage 282 may extend longitudinally along a nonlinear axis from a first end 284 to a second end 286. The fluid passage 282 may have a circular cross section. The first end 284 may be included on the second side 232 of the cradle 210, and the second end 286 may be defined in the connector tube 281 at the first peripheral side 241. In some embodiments, the first end 284 may be a fluid inlet configured to fluidly connect to a fluid outlet 148 of the inverter 144 (FIG. 4), and the second end 286 may be a fluid outlet configured to fluidly connect to a downstream component of the fluid coolant system 245 (FIG. 1). For example, the second end 286 may be fluidly connected to the turbomachine 102, for example, to provide cooling the electric motor 105 therein. It will be appreciated, however, that the second aperture 280 may be configured differently, for example, to provide flow to the inverter 144, to fluidly connect to another component, etc.

The support bracket 202 may further include a plurality of stiffening ribs 288. The stiffening ribs 288 may be integrally attached and included on the first face 231 of the cradle 210. There may be a plurality of stiffening ribs 288 that extend along the first face 231. For example, there may be a plurality of stiffening ribs 288 that extend longitudinally from the connector area 279, along the first face 231 and down respective ones of the standoffs 211, 212, 213, 214.

Figure 2:
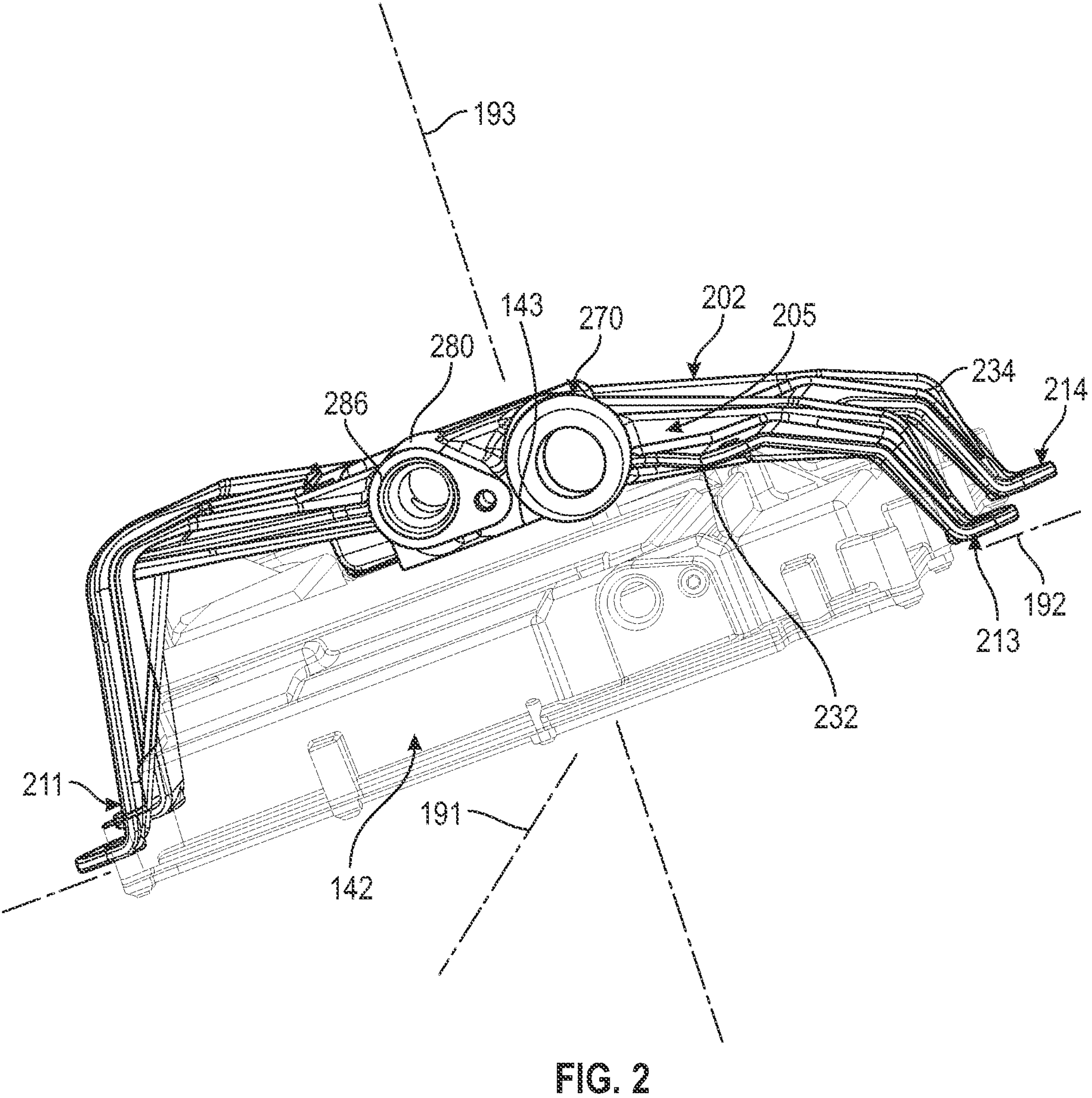
FIG. 2 is a perspective view of the support bracket and electric component according to example embodiments of the present disclosure.

As shown in FIGS. 2 and 3, the second side 232 may be shaped, dimensioned, positioned, etc. so as to correspond, fit, and/or nest to the outer surface 143 of the inverter 144. The second side 232 may be stepped (i.e., may include a plurality of step-like planar surfaces) so as to closely fit over the outer surface 143 of the inverter 144 and to be in close proximity thereto.

Methods of manufacturing will now be discussed according to example embodiments. The plate 205 may be formed from a stiff, strong, and robust material, such as metal, a polymeric material, and/or a composite material. The plate 205 may be formed via a casting process, via a molding process, or otherwise. Also, the cover 216 may be cut from a sheet of metallic, polymeric, or other material. In some embodiments, the plate 205 may be made from, coated with, or otherwise include a material that has low electrical conductivity.

Furthermore, the turbomachine 102 and fuel cell system 108 may be provided and supported, for example, on the support member 150. Also, the cradle 210 may be laid over the inverter 144 with the terminal connections 275 aligned along the third axis 193 with corresponding ones of a plurality of terminals 146 (FIG. 4) of the inverter 144. In some embodiments, the terminals 146 may project from the surface 143, and the terminals 146 may project through the holes 275 and into the first pocket 274. In other embodiments, additional wiring, electrical connectors, etc. may be connected to the terminals 146 and may project upward into the first pocket 274. Also, with the support bracket 202 positioned over the inverter 144, the first end 284 of the fluid passage 282 (FIG. 3) may align along the third axis 193 with a fluid coolant outlet 148 of the inverter 144.

As shown in FIG. 1, the support bracket 202 may be attached to the inverter 144. For example, a plurality of first fasteners 220, such as threaded bolts, may be used for this attachment. The first fasteners 220 may extend through the cradle 210 and into the inverter 144. In additional embodiments, vibration dampeners, thermal insulators, and/or electrical insulators may be included at the attachment between the inverter 144 and the support bracket 202.

In some embodiments, there may be three terminals 146 of the inverter 144 for a corresponding three-phase motor 105. The interior of the first pocket 274 may define a seat for electrical connectors that establish connection to the terminals 146. Wiring may be extended from the terminals 146 and may be extended through the connector tube 271. Also, electrical cables 299 (FIG. 1) may be removably attached to (or proximate to) the end 273 of the tube 271 with wiring for the terminals 146 extending therethrough. As such, the terminals 146 of the inverter 144 may be electrically connected to the motor 105 via the first aperture 270 of the support bracket 202.

Then, the cover 216 may be attached over the first pocket 274. In some embodiments, a seal member may be included between the cover 216 and the plate 205 to seal off the first pocket 274.

Also, attachment of the support bracket 202 to the inverter 144 may fluidly connect the fluid passage 282 to the fluid coolant outlet 148 of the inverter 144 (FIG. 4). A coolant line 298 may be connected to the second aperture 280 at the connector tube 281 (FIG. 1), and the other end of the coolant line 298 may be fluidly connected to the turbomachine 102 and the motor 105 therein. The coolant line 298 may be an outlet line for receiving coolant flow from the passage 282 and delivering the coolant to the motor 105. The coolant system 245 may also include another coolant line 297 that returns heated coolant from the motor 105 to a heat exchanger (not shown), a pump (not shown), and back to the inverter 144. In some embodiments, one or more seal members may be included for fluidly sealing the fluid junction between the support bracket 202 and the inverter 144, between the coolant line 298 and the support bracket 202, and/or between other junctions. Accordingly, the inverter 144 may be fluidly connected within the fluid coolant system 245 via the second aperture 280 of the support bracket 202. Thus, coolant may be pumped through the coolant system 245 for cooling the inverter 144, the heated coolant may flow through the support bracket 202 and further downstream in-series to the motor 105, and the coolant in the line 297 may be directed through a heat exchanger to be cooled before circulating back to the inverter 144. It will be appreciated, however, that the coolant system 245 may be configured differently (e.g., with different fluid connections, fluid routing, cooled components, etc.) without departing from the scope of the present disclosure. For example, in additional embodiments, the line 298 may be either an inlet or outlet line that fluidly connects the support bracket 202 to another component of the coolant system 245, such as a tank, a pump, another component that requires cooling, or otherwise. Furthermore, the line 297 may be either an inlet or outlet line that fluidly connects the inverter 144 to another component of the coolant system 245, such as a tank, a pump, another component that requires cooling, or otherwise.

Furthermore, the support bracket 202 may be attached to the support member 150. For example, a plurality of second fasteners 218 may be used to attach the legs 211, 212, 213, 214 to the support member 150. In some embodiments, the second fasteners 218 may be threaded bolts that extend through respective ones of the standoffs 211, 212, 213, 214 and into the support member 150. In additional embodiments, the support member 150 may include one or more vibration dampeners, thermal insulators, and/or electrical insulators may be included at the attachment to the support bracket 202.

Accordingly, the support bracket 202 of the e-machine system 100 may robustly support the inverter 144 (or other electrical component) independent of the electric motor 105 and the turbomachine 102. The support bracket 202 may also provide convenient electrical connection and fluid connection for the inverter 144. The support bracket 202 may be tailored specifically for supporting the inverter 144. The support bracket 202 may allow the inverter 144 to be quickly and conveniently repaired or replaced. Furthermore, this configuration allows the inverter 144 to be packaged compactly, for example, when there are significant space constraints for the e-machine system 100.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An e-machine system comprising:

an e-machine with a rotating group and a housing, the rotating group supported for rotation within the housing;

an electrical component that is electrically connected to the e-machine, the electrical component including at least one of an electrical terminal and a coolant passage for a fluid coolant;

a support bracket that supports and retains the electrical component outside the housing, the support bracket including an aperture for the at least one of the electrical terminal and the coolant passage;

a support member with an outer support surface, wherein the support bracket comprises a cradle and a standoff that is attached to the cradle, wherein the standoff extends from the cradle and is attached to the support member, wherein the cradle covers the electrical component with the electrical component retained between the cradle and the outer support surface and wherein the standoff comprises a plurality of standoff legs that are spaced apart about the outer periphery of the cradle, and wherein the plurality of standoff legs are attached to the support member.

2. The e-machine system of claim 1, wherein the electrical component is an inverter.

3. The e-machine system of claim 2, wherein the inverter includes both the electrical terminal and the coolant passage;

wherein the aperture is a first aperture providing access to the electrical terminal; and wherein the support bracket includes a second aperture that fluidly connects to the coolant passage.

4. The e-machine system of claim 1, wherein the electrical component includes an outer surface that includes the coolant passage, the outer surface being covered by the support bracket, wherein the support bracket includes the aperture for the coolant passage, and wherein the aperture is a through-hole extending through the support bracket that is fluidly connected to the coolant passage.

5. The e-machine system of claim 1, wherein the electrical component includes the electrical terminal, wherein the support bracket includes the aperture for the electrical terminal, and wherein the aperture is a pass-through aperture that is aligned with the electrical terminal.

6. The e-machine system of claim 1, further comprising a fastener that attaches the cradle and the electrical component.

7. The e-machine system of claim 1, wherein the cradle includes a first face, a second face, and an outer periphery that borders the first face and the second face;

wherein the cradle includes a connector area;

wherein the aperture is a first aperture of the support bracket for the electrical terminal, the first aperture at least partly defined in the connector area; and wherein the support bracket further includes a second aperture for the fluid passage, the second aperture at least partly defined in the connector area.

8. The e-machine system of claim 7, wherein the first aperture comprises a first pocket on the first face, a pass-through hole that is aligned with the electrical terminal that is open to the first pocket, and a hollow tube that extends between the first pocket and the outer periphery of the cradle.

9. The e-machine system of claim 7, wherein the second aperture comprises a support bracket fluid passage that extends from the second face to the outer periphery of the cradle.

10. The e-machine system of claim 1, wherein the support bracket comprises a plate that includes the aperture and a cover member that is removably attached to the plate to cover the aperture.

11. The e-machine system of claim 1, wherein the support bracket includes a stiffening rib.

12. A method of manufacturing an e-machine system comprising:

providing an e-machine with a rotating group and a housing, the rotating group supported for rotation within the housing;

electrically connecting an electrical component to the e-machine, the electrical component including at least one of an electrical terminal and a coolant passage for a fluid coolant;

providing a support member with an outer support surface;

supporting and retaining the electrical component relative to the e-machine outside the housing with a support bracket, the support bracket including an aperture for the at least one of the electrical terminal and the coolant passage; wherein the support bracket includes a cradle and a standoff that is attached to the cradle, wherein the standoff extends from the cradle and is attached to the support member, wherein the cradle covers the electrical component with the electrical component retained between the cradle and the outer support surface, and wherein the cradle includes the aperture; and wherein the standoff comprises a plurality of standoff legs that are spaced apart about the outer periphery of the cradle, and wherein the plurality of standoff legs are attached to the support member.

13. The method of claim 12, further comprising connecting a line to the support bracket and to the aperture, the line including at least one of a wire that electrically connects to the electrical terminal and a fluid passage that fluidly connects to the coolant passage.

14. The method of claim 12, wherein the electrical component is an inverter.

15. The method of claim 14, wherein the inverter includes both the electrical terminal and the coolant passage;

wherein the aperture is a first aperture providing access to the electrical terminal; and wherein the support bracket includes a second aperture that fluidly connects to the coolant passage.

16. The method of claim 14, further comprising fastening the support bracket to the inverter with a fastener.

17. The method of claim 14, wherein the support bracket includes a stiffening rib.

18. An e-machine system comprising:

an e-machine with a rotating group and a housing, the rotating group supported for rotation within the housing;

a support member with an outer support surface;

an inverter that is electrically connected to the e-machine, the inverter including an electrical terminal and a coolant passage for a fluid coolant;

a support bracket that is attached to the support member and that supports and retains the inverter outside the housing, the support bracket including a first aperture providing access for electrical connection to the electrical terminal of the inverter, the support bracket including a second aperture configured for fluid communication with the coolant passage of the inverter, wherein the support bracket comprises a cradle and a standoff that is attached to the cradle, wherein the standoff extends from the cradle and is attached to the support member, wherein the cradle covers the inverter with the inverter retained between the cradle and the outer support surface, and wherein the cradle includes t first and second apertures; and wherein the standoff comprises a plurality of standoff legs that are spaced apart about the outer periphery of the cradle, and wherein the plurality of standoff legs are attached to the support member.

* * * * *